(12) United States Patent
Hu et al.

(10) Patent No.: US 10,249,329 B1
(45) Date of Patent: Apr. 2, 2019

(54) CURRENT-PERPENDICULAR-TO-THE-PLANE (CPP) MAGNETORESISTIVE (MR) SENSOR WITH WEDGE SHAPED FREE LAYER

(71) Applicant: Western Digital Technologies, Inc., San Jose, CA (US)

(72) Inventors: Chih-Ching Hu, Pleasanton, CA (US); Yuankai Zheng, Fremont, CA (US); Yung-Hung Wang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 4 days.

(21) Appl. No.: 15/820,229

(22) Filed: Nov. 21, 2017

(51) Int. Cl.
G11B 5/39 (2006.01)

(52) U.S. Cl.
CPC .......... *G11B 5/3906* (2013.01); *G11B 5/3909* (2013.01); *G11B 5/3912* (2013.01); *G11B 2005/3996* (2013.01)

(58) Field of Classification Search
CPC .... G11B 5/3906; G11B 5/3909; G11B 5/3912
USPC ........................................ 360/324.12, 312.2
See application file for complete search history.

(56) References Cited

U.S. PATENT DOCUMENTS

| | | | |
|---|---|---|---|
| 5,465,185 A | 11/1995 | Heim et al. | |
| 7,035,062 B1 | 4/2006 | Mao et al. | |
| 7,746,603 B2 | 6/2010 | Gill | |
| 8,015,694 B2 | 9/2011 | Carey et al. | |
| 8,270,122 B2 | 9/2012 | Shiimoto et al. | |
| 8,339,752 B1 | 12/2012 | Hattori et al. | |
| 8,385,026 B2 | 2/2013 | Carey et al. | |
| 8,537,505 B2* | 9/2013 | Shiimoto ............... | B82Y 25/00 360/319 |
| 8,559,140 B2* | 10/2013 | Gao ...................... | G01R 33/093 360/319 |
| 8,582,251 B2* | 11/2013 | Gao ...................... | B82Y 25/00 360/324.12 |
| 8,767,356 B2* | 7/2014 | Leung .................... | B82Y 25/00 360/324.12 |
| 9,001,473 B1 | 4/2015 | Gao et al. | |
| 9,047,892 B2 | 6/2015 | Childress et al. | |
| 9,177,575 B1 | 11/2015 | Gao et al. | |
| 9,437,812 B2 | 9/2016 | Zhao et al. | |

(Continued)

OTHER PUBLICATIONS

Y.M. Lee et al., "Giant tunnel magnetoresistance and high annealing stability in CoFeB/MgO/CoFeB magnetic tunnel junctions with synthetic pinned layer", Appl. Phys. Lett. 89, 042506 (2006) https://arxiv.org/ftp/cond-mat/papers/0606/0606503.pdf.

*Primary Examiner* — Jefferson A Evans
(74) *Attorney, Agent, or Firm* — Thomas R. Berthold

(57) ABSTRACT

A current perpendicular-to-the-plane magnetoresistive (CPP-MR) sensor for a magnetic recording medium has a substantially wedge-shaped free ferromagnetic layer. The free layer thickness is tapered from the back edge (the edge recessed from the medium-facing surface) to the front edge at the medium-facing surface. The thinner free layer front edge thickness reduces the read gap (the spacing between the two sensor magnetic shields), which improves the resolution of the sensor, which in turn allows the bits to be placed closer together in the along-the-track direction. The free layer is thicker at the back edge so the volume of free layer ferromagnetic material can be maintained at the level required for high amplitude of the readback signal.

19 Claims, 13 Drawing Sheets

Side Sectional View

(56) References Cited

U.S. PATENT DOCUMENTS

| | | | | |
|---|---|---|---|---|
| 2004/0252417 | A1* | 12/2004 | Hasegawa | G11B 5/3906 |
| | | | | 360/324.11 |
| 2007/0230066 | A1* | 10/2007 | Gill | B82Y 25/00 |
| | | | | 360/324.1 |
| 2009/0286106 | A1* | 11/2009 | Gill | B82Y 10/00 |
| | | | | 428/811.2 |
| 2012/0134057 | A1* | 5/2012 | Song | B82Y 10/00 |
| | | | | 360/319 |
| 2012/0214020 | A1* | 8/2012 | Chou | B82Y 10/00 |
| | | | | 428/811.2 |
| 2012/0229935 | A1* | 9/2012 | Song | B82Y 25/00 |
| | | | | 360/313 |
| 2014/0268421 | A1* | 9/2014 | Zhu | G11B 5/3912 |
| | | | | 360/235.4 |

\* cited by examiner

GBS View

GBS View

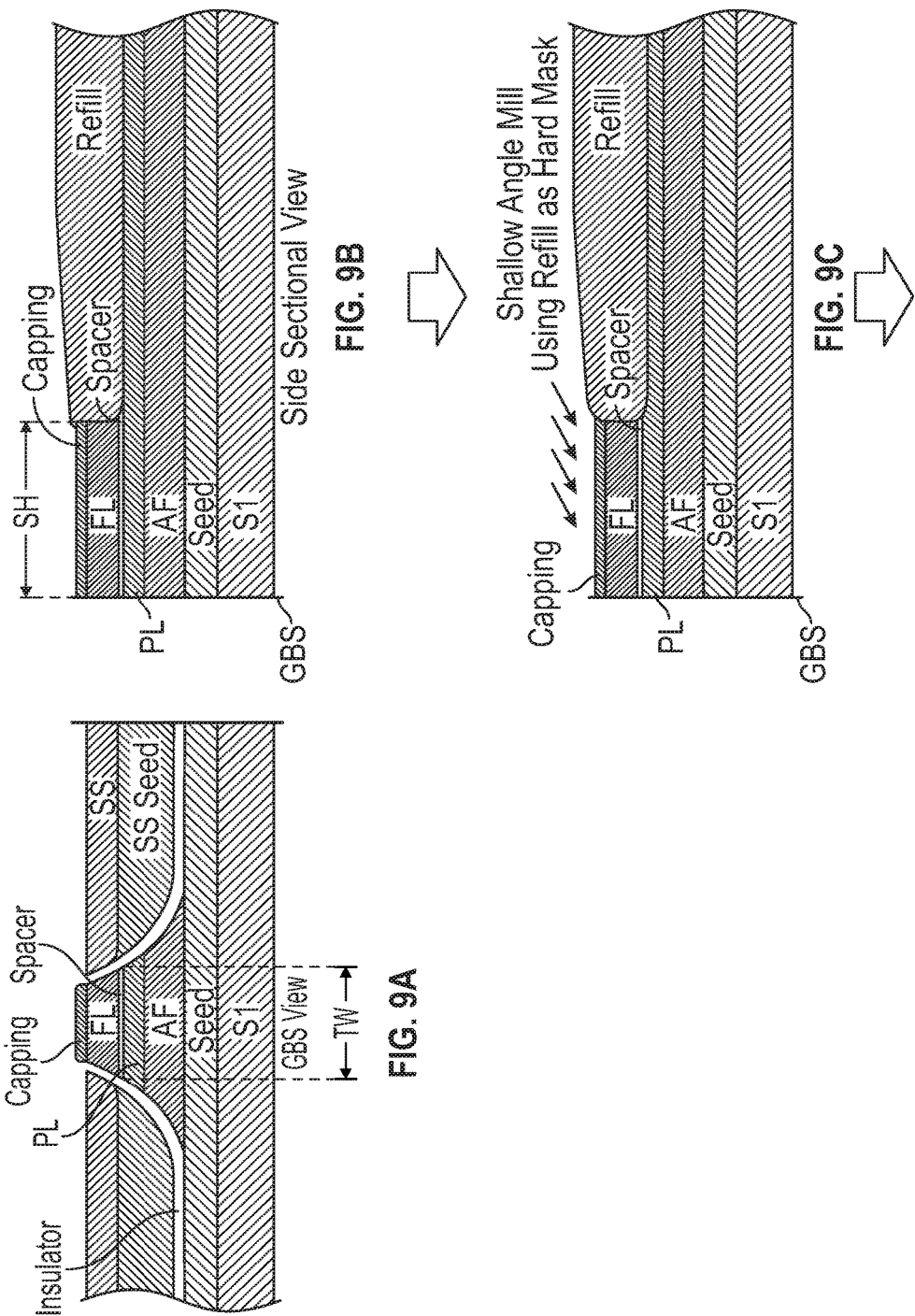

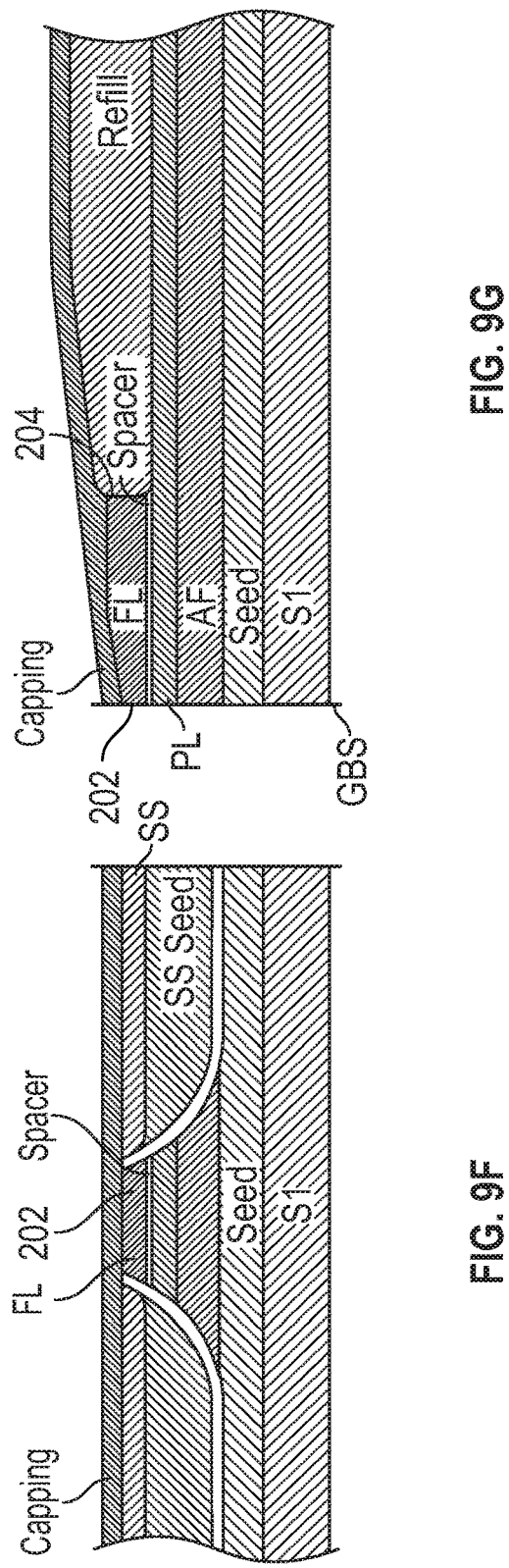

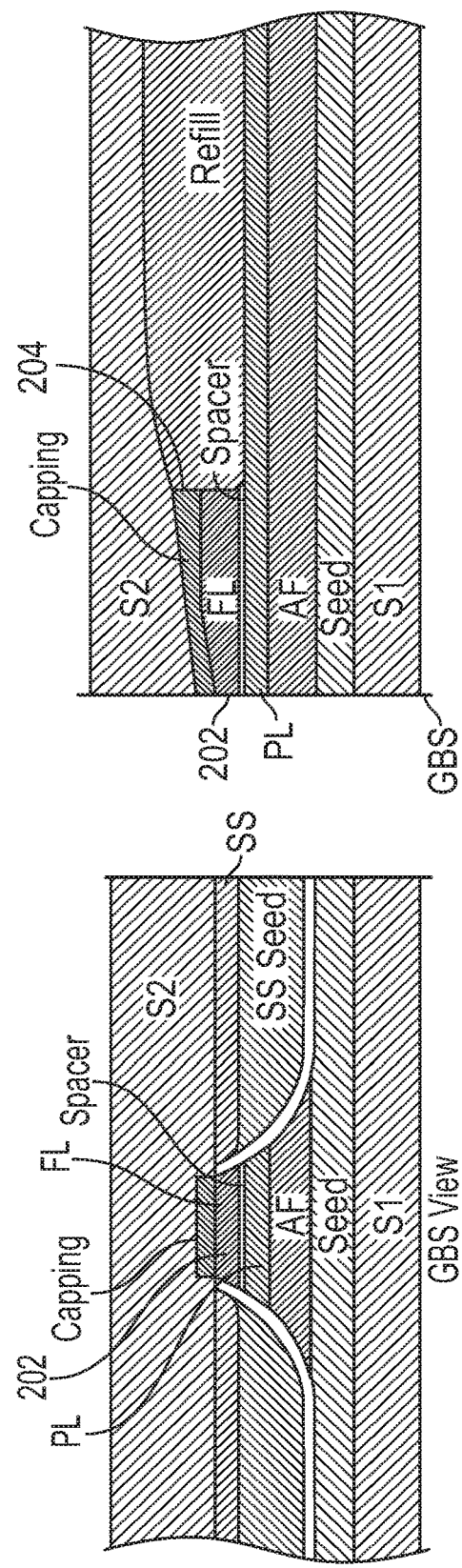

CURRENT-PERPENDICULAR-TO-THE-PLANE (CPP) MAGNETORESISTIVE (MR) SENSOR WITH WEDGE SHAPED FREE LAYER

BACKGROUND

Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a CPP-MR sensor with an improved ferromagnetic sensing or free layer.

Background of the Invention

A conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the sensing or free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR sensors, another type of CPP-MR sensor is a magnetic tunnel junction sensor, also called a tunneling MR or TMR sensor, in which the nonmagnetic spacer layer is a very thin nonmagnetic insulating tunnel barrier layer like $TiO_2$, MgO or $Al_2O_3$. The barrier layer is sufficiently thin that quantum-mechanical tunneling of charge carriers occurs between the two ferromagnetic layers. This quantum-mechanical tunneling process is electron spin dependent, which means that an electrical resistance measured when applying a sense current across the junction depends on the spin-dependent electronic properties of the ferromagnetic and barrier layers, and is a function of the relative orientation of the magnetizations of the two ferromagnetic layers.

The sensor stack in a CPP-MR read head is located between two shields of magnetically permeable material that shield the read head from recorded data bits on the disk that are neighboring the data bit being read. The free layer in the sensor stack has a front edge that faces the disk with a width referred to as the track width (TW). The free layer has a back edge recessed from the front edge that faces the disk, with the dimension from the front disk-facing edge to the back edge referred to as the stripe height (SH). The sensor stack is generally surrounded at the TW edges and back edge by insulating material.

SUMMARY

In CPP-MR sensors the spacing between the two shields is referred to as the read gap. It is desirable to make the read gap as small as possible, but without a loss in magnetoresistance ($\Delta R/R$) and readback signal amplitude. The smaller the read gap the higher the resolution of the sensor. A higher resolution means the sensor can detect smaller-sized data bits, which means the bits can be placed closer together, thus increasing the along-the-track data density.

In embodiments of this invention, the free layer is substantially wedge-shaped, with a tapered thickness from the back edge to the front edge. The thinner free layer front edge reduces the read gap, which improves the resolution of the sensor, which in turn allows the bits to be placed closer together in the along-the-track direction. However, because the free layer is thicker at the back edge the volume of ferromagnetic material in the free layer can be maintained at the level required for good performance, i.e., high amplitude of the readback signal.

For a fuller understanding of the nature and advantages of the present invention, reference should be made to the following detailed description taken together with the accompanying figures.

BRIEF DESCRIPTION OF THE DRAWINGS

FIGS. 9A-9K are GBS and side sectional views showing the process for forming the sensor with wedge-shaped free layer according to embodiments of the invention.

DETAILED DESCRIPTION

Figure 1:
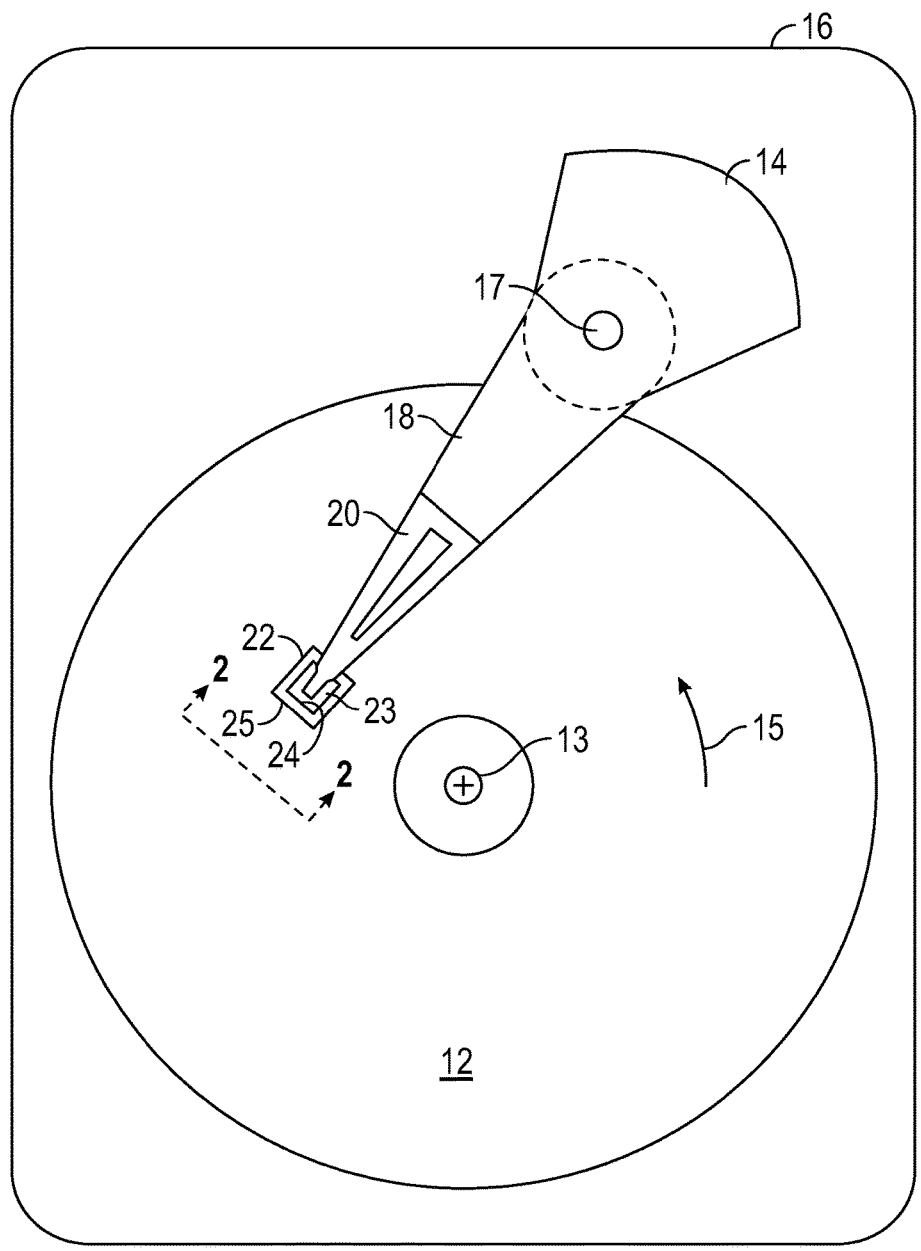
FIG. 1 is a schematic top view of a conventional magnetic recording hard disk drive with the cover removed.

The CPP-MR sensor of this invention has application for use in a magnetic recording disk drive, the operation of which will be briefly described with reference to FIGS. 1-4B. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or gas-bearing slider 22 is attached to the flexure 23. A magnetic recording read/write head 24 is formed on the trailing surface 25 of slider 22. The flexure 23 and suspension 20 enable the slider to "pitch" and "roll" on a gas-bearing (typically air or helium) generated by the rotating disk 12. Typically, there are multiple disks stacked on a hub that is rotated by the spindle motor, with a separate slider and read/write head associated with each disk surface.

Figure 2:
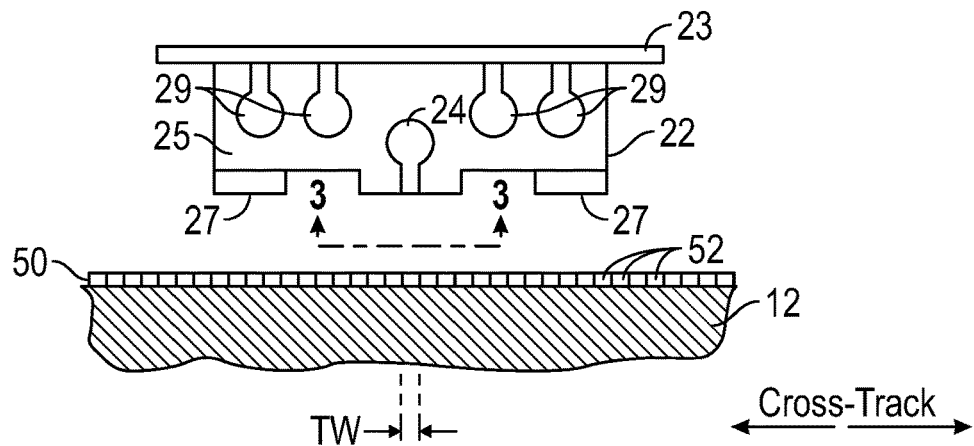
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has a gas-bearing surface (GBS) 27 facing the disk 12 and a trailing surface 25 generally perpendicular to the GBS. The GBS 27 causes the airflow from the rotating disk 12 to generate a bearing of air (or helium) that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25. The disk 12 has a recording layer 50 of continuous magnetizable material with data tracks 52. The concentric data tracks with track width TW are created when the write head writes on the continuous recording layer.

Figure 3:
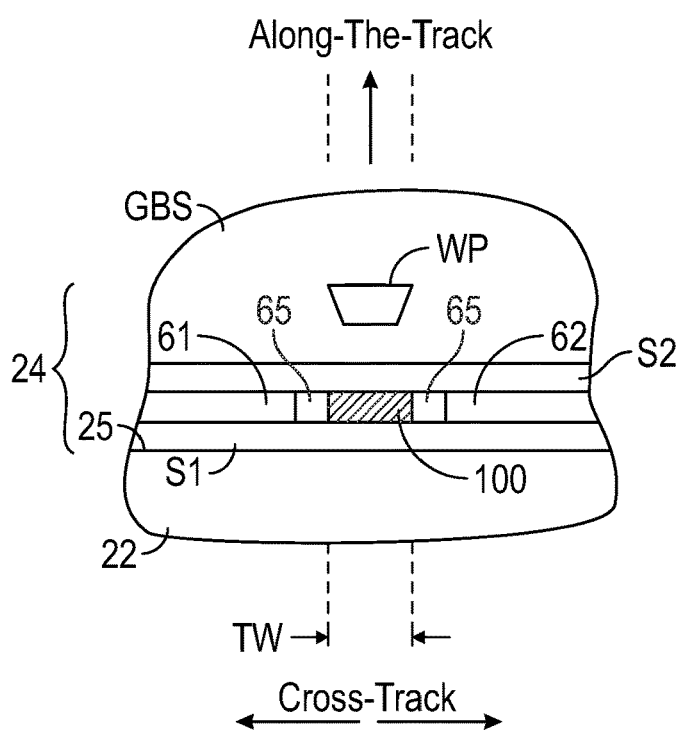
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. FIG. 3 is not to scale because of the difficulty in showing very small dimensions. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of magnetically permeable material, typically a NiFe alloy like permalloy or a FeSiAl alloy like sendust. The shields S1, S2 may also be electrically conductive so they can function as the electrical leads to the read head 100 for the sense current $I_S$, which is directed generally perpendicularly through the layers in the sensor stack. The shields function to shield the read head 100 from recorded data bits that are neighboring the data bit being read. Typically each shield S1, S2 is several microns thick in the along-the-track direction, as compared to the total thickness of the read sensor 100 in the along-the-track direction, which may be in the range of 15 to 50 nm. In FIG. 3, the portions identified as 61, 62 on opposite sides of read head 100 are cross-track magnetic side shields. They are separated from read head 100 by electrically-insulative material 65. The side shields 61, 62 prevent the read head 100 from detecting bits in tracks adjacent to the track being read.

Figure 4A:
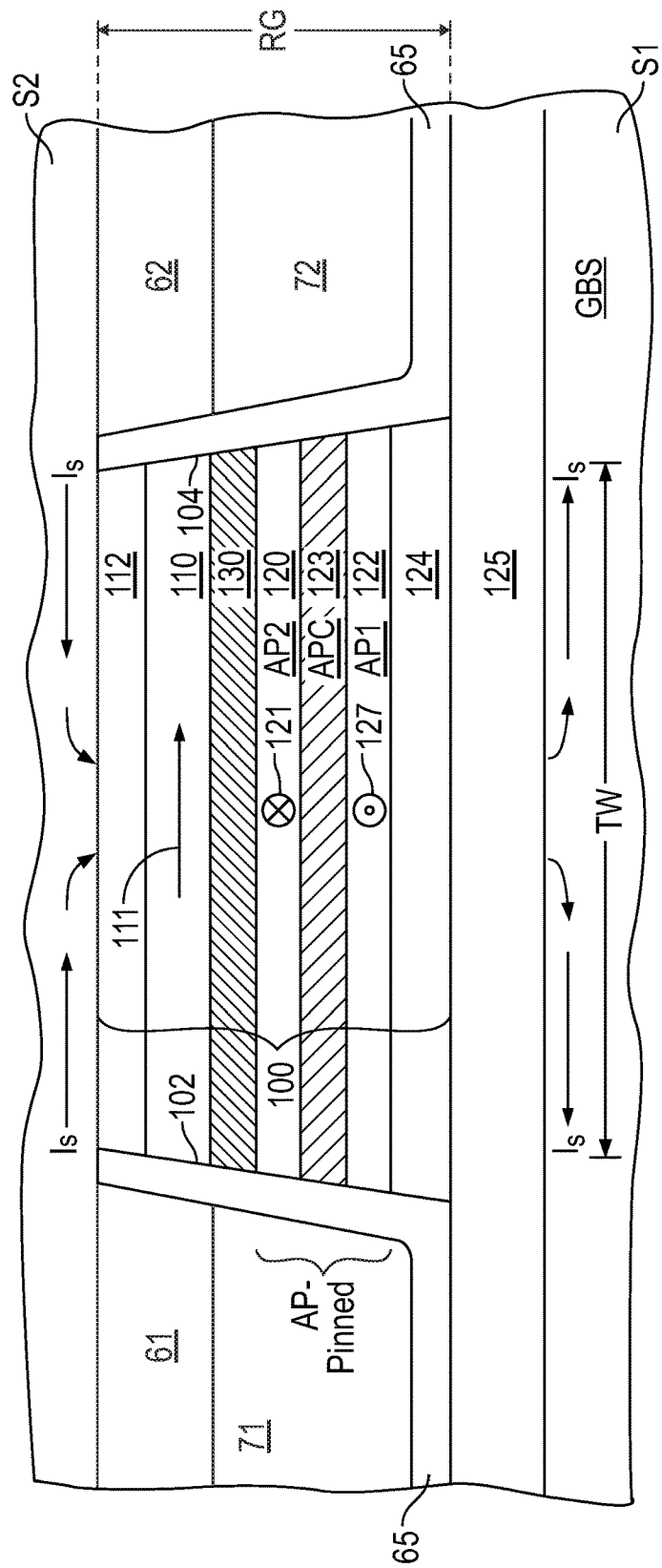
FIG. 4A is a view of the slider gas-bearing surface (GB S) as would be viewed from the disk showing the prior art current perpendicular-to-the-plane magnetoresistive (CPP-MR) sensor layers between the magnetic shield layers.

FIG. 4A is a cross-sectional view illustrating the structure of a prior-art CPP-MR read head 100 like that used in a magnetic recording disk drive. This cross-sectional view is a view of what is commonly referred to as the gas-bearing surface (GBS) of the CPP-MR read head 100. The medium-facing surface or the GBS of the slider 22 shall mean the surface of the slider that is covered with a thin protective overcoat, the actual outer surface of the slider if there is no overcoat, or the outer surface of the overcoat. The phrase "substantially at the medium-facing surface" or "substantially at the GBS" shall mean at the surface or slightly recessed from the surface. The CPP-MR read head 100 includes a sensor stack of layers formed between two ferromagnetic shield layers S1, S2 that are typically made of electroplated NiFe alloy films. The sensor stack includes a ferromagnetic reference layer 120 having a pinned magnetization 121 oriented transversely (away from the page), a ferromagnetic free layer 110 having a magnetization 111 that can rotate in the plane of layer 110 in response to transverse external magnetic fields from a recording disk, and a nonmagnetic spacer layer 130. For a CPP-GMR sensor the spacer layer 130 is typically copper (Cu). For a TMR sensor the spacer layer 130 is the tunneling barrier layer which is typically made of magnesium oxide (MgO) or another oxide such as alumina ($Al_2O_3$) or titanium oxide ($TiO_2$). The free layer 110 has spaced-apart side edges 102, 104 that define the sensor trackwidth (TW).

The reference layer 120 may be a conventional "simple" or single pinned layer that has its magnetization direction 121 pinned or fixed, typically by being exchange coupled to an antiferromagnetic layer. However, in the example of FIG. 4A, the reference layer 120 is part of the well-known antiparallel (AP) pinned or flux-closure structure, also called a "laminated" pinned layer, as described in U.S. Pat. No. 5,465,185. The ferromagnetic pinned and reference layers 122, 120 are typically formed of CoFe or CoFeB alloys. The AP-pinned structure minimizes magnetostatic coupling of the reference layer 120 with the free layer 110. The AP-pinned structure includes the reference ferromagnetic (AP2) layer 120 and a lower or "pinned" ferromagnetic (AP1) layer 122 that are antiferromagnetically coupled across an AP coupling (APC) layer 123, such as Ru, Ir, Rh, or Cr, or alloys thereof. Due to the antiparallel coupling across the APC layer 123, the reference (AP2) and pinned (AP1) ferromagnetic layers 120, 122 have their respective magnetizations 121, 127 oriented antiparallel to each other. Thus, the net magnetization of the AP2 and AP1 ferromagnetic layers 120, 122 is so small that a demagnetizing field induced by the flux closure structure in the ferromagnetic free layer 110 is substantially minimized, and thus it becomes feasible for the CPP-MR read head to operate optimally.

Located between the lower shield layer S1 and the AP-pinned structure are a seed layer 125 and an antiferromagnetic (AF) pinning layer 124. The seed layer 125 facilitates the AF pinning layer 124 to grow a microstructure with a strong crystalline texture and thus develop strong antiferromagnetism. The seed layer 125 may be a single layer or multiple layers of different materials, like a Ta/Ru bilayer or a NiFe/Ru bilayer. The AF pinning layer 124, which is typically an IrMn alloy, thus strongly exchange-couples to the ferromagnetic pinned layer 122, and thereby rigidly pins the magnetization 127 of the ferromagnetic pinned layer 122 in a direction perpendicular to and away from the GBS. The antiparallel coupling across the APC layer 123 then subsequently rigidly pins the magnetization 121 of the ferromagnetic reference layer 120 in a direction perpendicular to and towards the GBS, and antiparallel to magnetization 127. As a result, the net magnetization of the ferromagnetic AP2 and AP1 layers 120, 122 is rigidly pinned, and thus the optimal operation of the CPP-MR read head is ensured.

Located between the ferromagnetic free layer 110 and the upper shield layer S2 is a nonmagnetic cap or capping layer 112. The layer 112 protects the ferromagnetic free layer 110 from chemical and mechanical damages during processing, so that ferromagnetic free layer 110 maintains ferromagnetic properties suitable for a read head. The capping layer 112 is typically made of a Ru, Ti, or Ta film or a multilayer thereof, like a Ru/Ta/Ru trilayer. The stack of sensor layers between the seed layer 125 and upper shield S2 has a thickness that is defined as the read gap (RG).

Side magnetic shields 61, 62 are located on each side of free layer 110 and are insulated from free layer 110 by nonmagnetic electrically insulating material 65 like alumina ($Al_2O_3$), MgO or a silicon nitride ($SiN_x$). The side shields 61, 62 are typically formed of a soft magnetically permeable material and provide a magnetic bias to the magnetization of free layer 110. "Soft" magnetic materials can be easily magnetized and demagnetized at low magnetic fields. The soft side shields can be formed of an alloy comprising Ni and Fe with permeability (pi) preferably greater than 100. Any of the known materials suitable for use in the along-the-track shields S1 and S2 may be used for the side shields. Each side shield 61, 62 is formed on a seed layer 71, 72 respectively, which may be formed of a nonmagnetic material like NiFeCr, Ta or W.

In the presence of external magnetic fields in the range of interest, i.e., magnetic fields from written data on the recording disk, while the net magnetization of the ferromagnetic layers 120, 122 remains rigidly pinned, the magnetization 111 of the ferromagnetic free layer 110 will rotate in responses to the magnetic fields. Thus, when a sense current $I_S$ flows from the upper shield layer S2 perpendicularly through the sensor stack to the lower shield layer S1, the magnetization rotation of the ferromagnetic free layer 110 will lead to the variation of the angle between the magnetizations of the ferromagnetic reference layer 120 and the ferromagnetic free layer 110, which is detectable as a change in electrical resistance. The free layer 110 is typically a single layer or multiple layers of ferromagnetic material. However, alternatively the free layer may be an antiparallel free (APF) structure. An APF structure comprises a first free ferromagnetic layer, a second free ferromagnetic layer, and an antiferromagnetic coupling (AFC) layer between the first and second free layers. The AFC layer couples the two free layers together antiferromagnetically with the result that they maintain substantially antiparallel magnetization directions during operation of the sensor. A CPP-MR sensor with an APF structure is descried in U.S. Pat. No. 9,047,892 B2, which is assigned to the same assignee as this application.

Figure 4B:
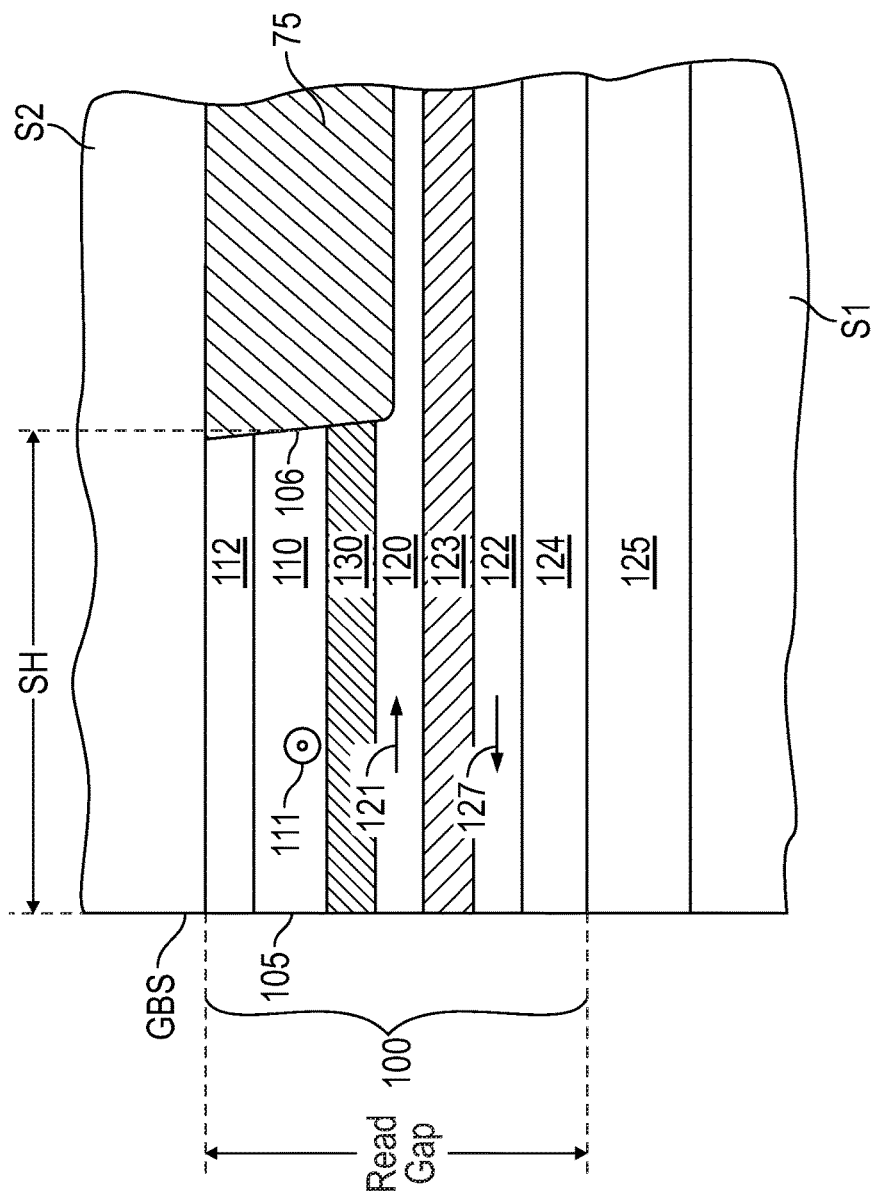
FIG. 4B is a sectional view of the CPP-MR read head of FIG. 4A taken through a plane orthogonal to both the gas-bearing surface (GBS) and to the planes of the layers in the sensor stack.

FIG. 4B is a side sectional view of the CPP-MR sensor structure of FIG. 4A taken through a plane orthogonal to both the GBS and to the planes of the layers in the sensor stack. The free layer 110 has a front edge 105 at the GBS and a back edge 106 recessed from the GBS by a distance that defines the stripe height (SH) of the free layer 110. A layer 75 of insulating refill material, typically alumina, is formed on the reference layer 120 and adjacent the back edge 106 of the free layer 110.

The CPP-MR read head 100 described above and shown in FIGS. 4A-4B is fabricated in the conventional manner, wherein the layers in the sensor stack are deposited by sputter deposition or other known thin-film disposition techniques, after which the stack is lithographically patterned and etched to define the desired dimensions for the read head. The structure is then annealed, typically at about 240° C. to 280° C. for about 3 to 5 hours. The annealing is done to establish exchange bias between the antiferromagnetic layer 124 and the pinned layer 122. The annealing is done in the presence of an applied magnetic field to set the direction of the magnetization 127 of the pinned ferromagnetic layer 122. For a TMR sensor the annealing also improves the crystallinity of the MgO tunneling barrier layer (spacer layer 130).

One type of CPP-MR sensor has been proposed that does not have a ferromagnetic reference layer with a fixed or pinned magnetization direction, but instead has a free layer that comprises dual ferromagnetic sensing films or free layers separated by a nonmagnetic spacer layer. In the absence of an applied magnetic field, the magnetizations of the two free layers are oriented generally orthogonal to one another with parallel magnetization components in the sensing direction of the magnetic field to be detected and antiparallel components in the orthogonal direction. With a sense current applied perpendicularly to the layers in the sensor stack and in the presence of an applied magnetic field in the sensing direction, the two magnetizations rotate in opposite directions, changing their angle relative to one another, which is detectable as a change in electrical resistance. Because of this type of behavior of the magnetizations of the two free layers, this type of CPP sensor is often referred to as a "scissoring-type" of CPP sensor. Like conventional CPP-MR sensors, scissoring-type CPP-MR sensors may be either GMR or TMR sensors. In a scissoring-type CPP-MR sensor, a "hard-bias" layer of ferromagnetic material located at the back edge of the sensor (opposite the GBS) applies an approximately fixed, transverse magnetic "bias" field to the sensor. Its purpose is to bias the magnetizations of the two free layers so that they are approximately orthogonal to one another in the quiescent state, i.e., in the absence of an applied magnetic field. Without the hard-bias layer, the magnetization directions of the two free layers would tend to be oriented antiparallel to one another. This tendency to be oriented antiparallel results from strong magnetostatic interaction between the two free layers once they have been patterned to sensor dimensions, but may also be the result of exchange coupling between the magnetic layers through the spacer layer. A scissoring-type of CPP-MR sensor is described in U.S. Pat. No. 7,035,062 B1 and U.S. Pat. No. 8,015,694 B2.

Figure 5A:
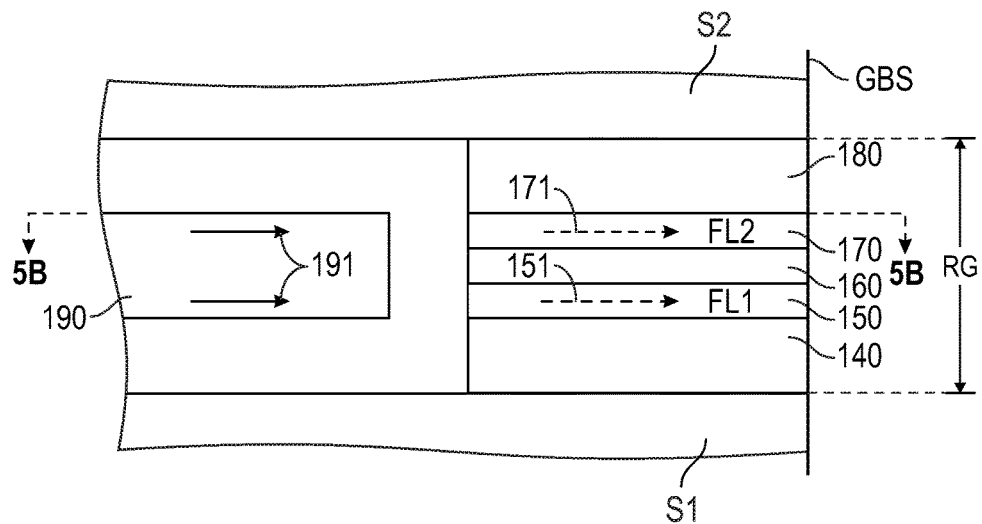
FIG. 5A is a sectional view and shows the GBS as a plane normal to the paper for a scissoring-type CPP-MR read head according to the prior art.
Figure 5B:
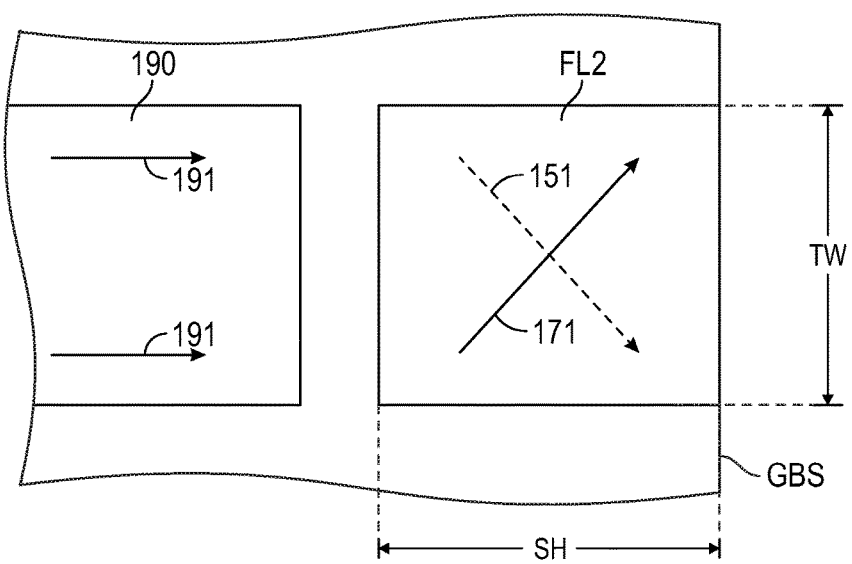
FIG. 5B is a view along the plane 5B-5B in FIG. 5A with the GBS as a plane normal to the paper and shows the trackwidth (TW) and stripe height (SH) dimensions of the sensor.

FIG. 5A is a sectional view and shows the GBS as a plane normal to the paper for a scissoring-type CPP GMR or TMR read head. FIG. 5B is a view along the plane 5B-5B in FIG. 5A with the GBS as a plane normal to the paper and shows the trackwidth (TW) and stripe height (SH) dimensions of the sensor. The read head comprises a stack of layers, including dual sensing or free layers FL1, FL2, formed between the two magnetic shield layers S1, S2. The sensor layers are a first ferromagnetic free or sensing layer (FL1) 150 having a magnetic moment or magnetization direction 151 and a second ferromagnetic free or sensing layer (FL2) 170 having a magnetic moment or magnetization direction 171. FL1 and FL2 comprise self-referenced free layers, and hence no pinned or pinning layers are required, unlike in conventional CPP-MR sensors. FL1 and FL2 have their magnetization directions 151, 171, respectively, oriented in-plane and preferably generally orthogonal to one another in the absence of an applied magnetic field. While the magnetic moments 151, 171 in the quiescent state (the absence of an applied magnetic field) are preferably oriented generally orthogonal, i.e., between about 70 and 90 degrees to each other, they may be oriented by less than generally orthogonal, depending on the bias point at which the sensor is operated. A nonmagnetic spacer layer 160 separates FL1 and FL2. Spacer layer 160 is a nonmagnetic electrically conductive metal or metal alloy, like Cu, Au, Ag, Ru, Rh, Cr and their alloys, if the sensor is a CPP-GMR sensor, and a nonmagnetic insulating material, like $TiO_2$, MgO or $Al_2O_3$, if the sensor is a CPP-TMR sensor. Located between the lower shield layer S1 and the FL1 is an underlayer or seed layer 140. Located between FL2 and the upper shield layer S2 is a capping layer 180. The bottom and top shields S1 and S2 may be used as electrical leads, or separate leads layers may be formed between the shields and the sensor.

In the presence of an external magnetic field in the range of interest, i.e., magnetic fields from recorded data on the medium, the magnetization directions 151 and 171 of FL1 and FL2, respectively, will rotate in opposite directions. Thus, when a sense current is applied perpendicularly through the stack, the magnetic fields from the recorded data on the disk will cause rotation of the magnetizations 151, 171 in opposite directions relative to one another, which is detectable as a change in electrical resistance.

FIG. 5B shows the in-plane generally orthogonal relative orientation of magnetization directions 151, 171, with magnetization direction 151 being depicted as a dashed arrow because it is the magnetization direction of underlying FL1 which is not visible in FIG. 5B. As can be seen from FIG. 5B, in the absence of an applied magnetic field, the magnetization directions or vectors 151, 171 have parallel components in the sensing direction of the magnetic field to be detected (perpendicular to the GBS) and antiparallel components in the orthogonal direction (parallel to the GB S). FIGS. 5A and 5B show a hard-bias layer 190 recessed from the GBS. The hard bias layer 190 is magnetized in-plane in the direction 191. Hard bias layer 190 stabilizes or biases the FL1, FL2 magnetization directions 151, 171 so they make a non-zero angle relative to one another, preferably a generally orthogonal relative orientation, by rotating them away from what would otherwise be an antiparallel orientation. Referring to FIG. 5B, the detected signal field is generally perpendicular to the GBS and is aligned generally collinearly with the bias field 191 from the hard bias layer 190.

In all types of CPPP-MR sensors it is desirable to make RG as small as possible, but without a loss in magnetoresistance (ΔR/R) and readback signal amplitude, so that the read head can have high resolution to detect smaller-sized data bits and still maintain desired reading performance. To achieve higher recording density, the bit size needs to shrink and the RG needs to be reduced to match the performance requirement.

In embodiments of this invention, the free layer is substantially wedge-shaped, with a tapered thickness from the back edge to the front edge. The thinner free layer front edge reduces the RG, which improves the resolution of the sensor, which in turn allows the bits to be placed closer together in the along-the-track direction. However, because the free layer is thicker at the back edge the volume of ferromagnetic material can be maintained at the level required for good performance, i.e., high amplitude of the readback signal.

Figure 6A:
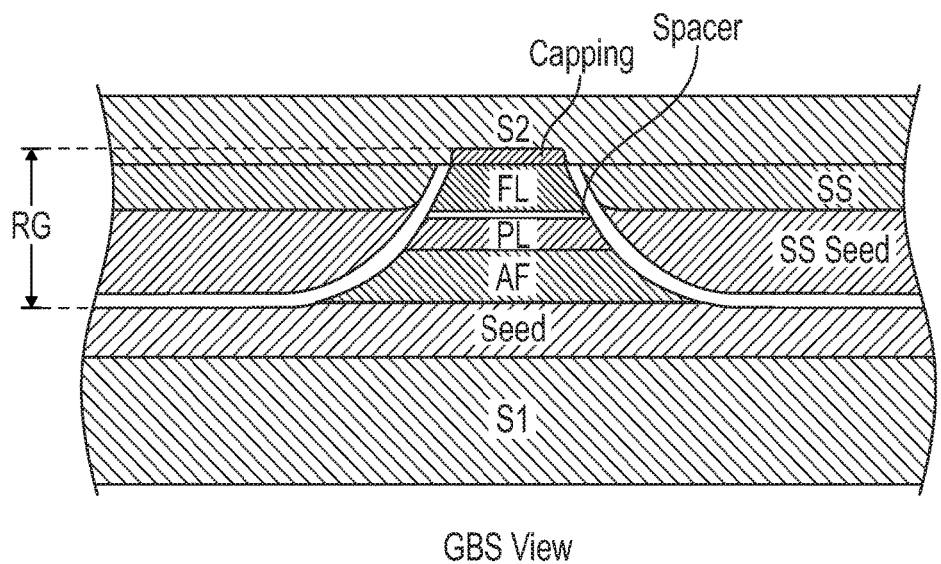
FIG. 6A is a GBS view of a prior art CPP-MR sensor.
Figure 6B:
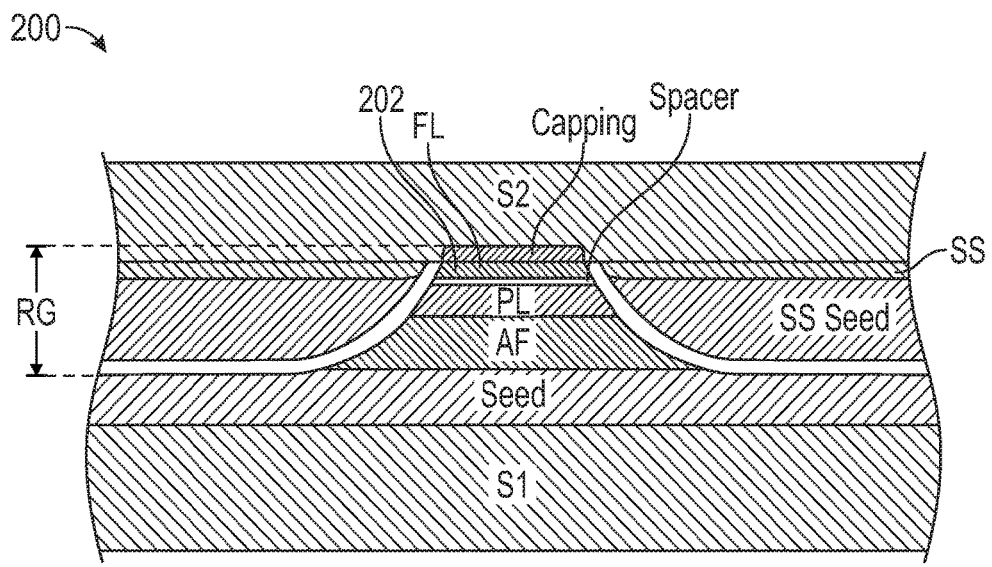
FIG. 6B is a GBS view of a CPP-MR sensor according to an embodiment of the invention.

FIG. 6A is a GBS view of a prior art sensor and FIG. 6B is a GBS view of a sensor according to an embodiment of the invention. The sensor 200 depicted in FIG. 6B is substantially the same as the prior art CPP-MR sensors previously descried, except for the shape of the free layer with reduced thickness of its front edge 202 substantially at the GBS. Thus FIGS. 6A-6B do not depict all the details of the sensors, but merely the shields S1, S2, the seed layer, the antiferromagnetic (AF) layer, the pinned layer (PL), the spacer layer, the free layer (FL) and the capping layer. The FL may be a conventional single or multilayer free layer, a synthetic free layer, or dual self-referenced free layers in a scissoring-type sensor. The PL may be a simple pinned layer or an AP-pinned structure.

Figure 7A:
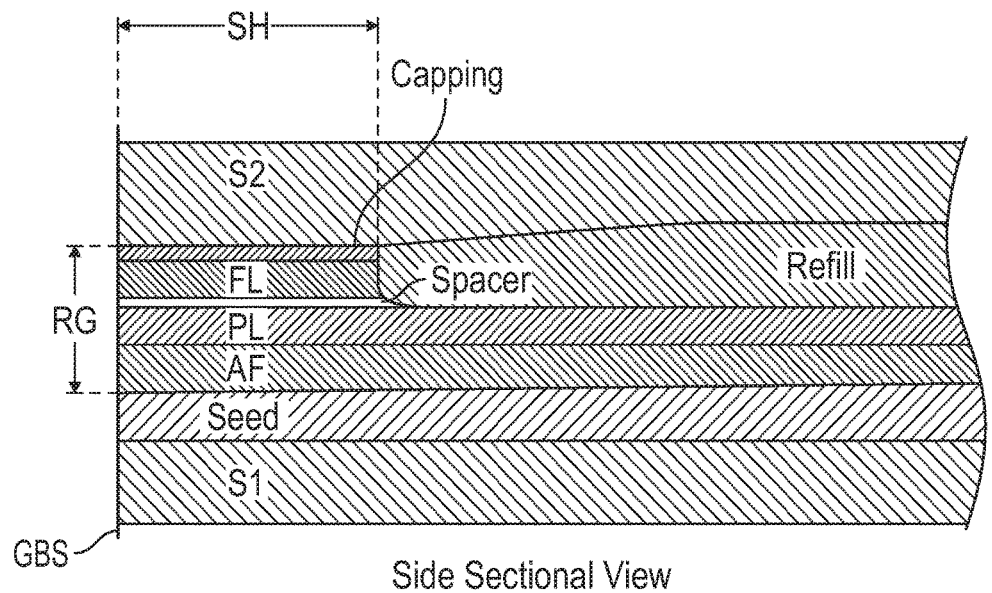
FIG. 7A is a side sectional view of the sensor shown in FIG. 6A.
Figure 7B:
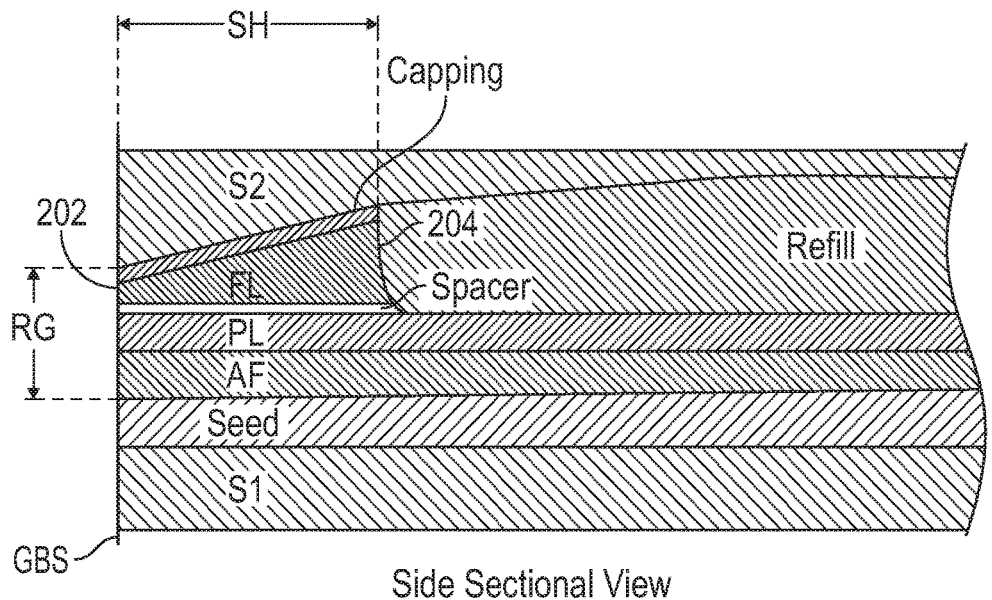
FIG. 7B is a side sectional view of the sensor shown in FIG. 6B.

FIGS. 7A and 7B are corresponding side sectional views of FIGS. 6A and 6B, respectively. In the prior art, the typical RG thicknesses are between about 20-30 nm, with the FL making up about 50% of the thickness, or about 60-70% for a scissoring-type sensor. The typical SH is between about 25-50 nm. FIG. 7B shows the FL taper of sensor 200, with the back edge 204 being thicker than the front edge 202. In the preferred embodiment back edge 204 is at least twice as thick as front edge 202. The tapered FL reduces the RG by at least 5 nm. In one example, in a prior art sensor (FIG. 7A) the RG may be 25 nm and the FL may have a SH of 30 nm and a thickness of 10 nm. In the FL of sensor 200 (FIG. 7B) the SH may also be 30 nm, but the FL thickness is tapered from 15 nm at the back edge 204 to 5 nm at the front edge 202. The RG is thus reduced from 25 nm to 20 nm but the total free layer volume is unchanged so the amplitude of the detected readback signal remains the same. The readback signal amplitude is related to the moment of the free layer, i.e., $M_s t$, where $M_s$ is the saturation magnetization of the ferromagnetic material and t is the thickness.

Figure 8:
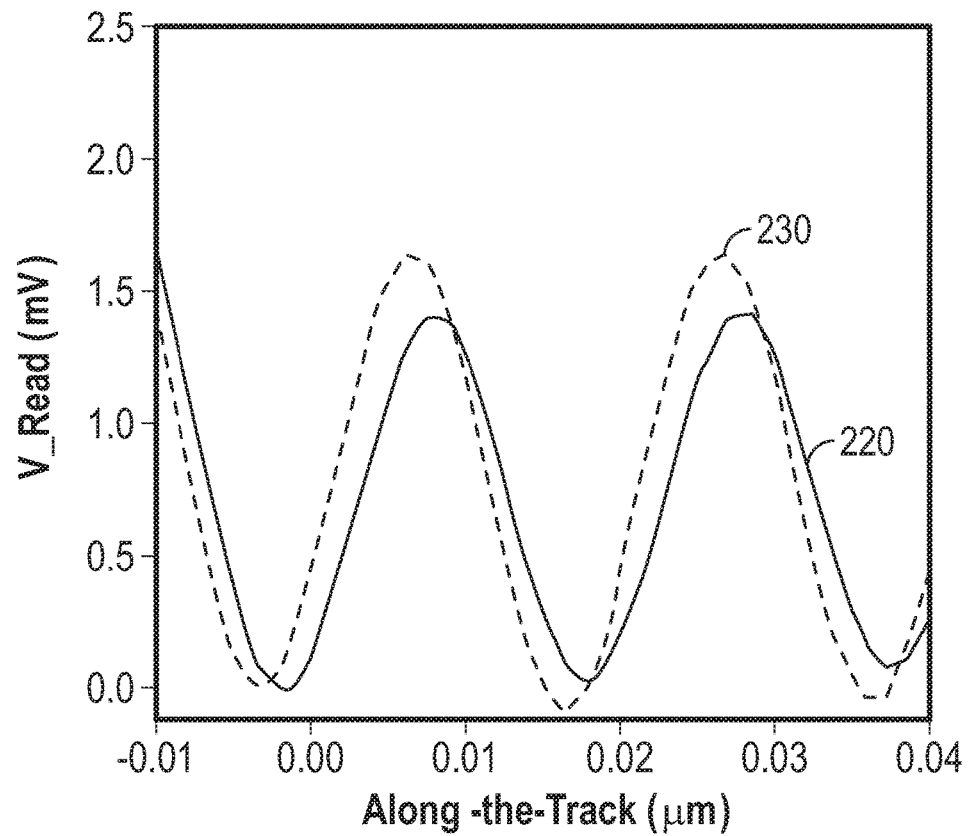
FIG. 8 is a graph comparing the readback signal amplitude as a function of along-the-track position for a prior art sensor with a conventional free layer to a sensor with a wedge-shaped free layer according to an embodiment of the invention.

FIG. 8 is a graph comparing the readback signal amplitude as a function of along-the-track position for a prior art sensor with a conventional free layer to a sensor with a wedge-shaped free layer according to an embodiment of the invention. In this computer simulation example, the bit length is 10 nm and the signal was read back at 1T frequency, i.e., the media pattern length is 1 bit. Curve 220 is the readback signal amplitude for a prior art sensor with a TW of 24-28 nm, a RG of 26+/−5 nm, a SH of 37 nm and a single FL with a constant thickness of 13 nm. Curve 230 is the readback signal amplitude for a sensor with the same dimensions except that the FL thickness was tapered from 22 nm at the back edge to 4 nm at the front edge. This results in a reduction in the RG of 9 nm, and with an increase in readback signal amplitude. The resolution of a sensor can be calculated from the following equation:

$$\text{Resolution} = (V\_\text{read}@3T/V\_\text{read}@6T)*100$$

where 3T means the media pattern length is 3 bits and 6T means the media pattern length is 6 bits. For the prior art sensor shown by curve 220, the resolution was 35.09, while for the sensor shown by curve 230, the resolution was 40.76.

Figures 9D, 9E:
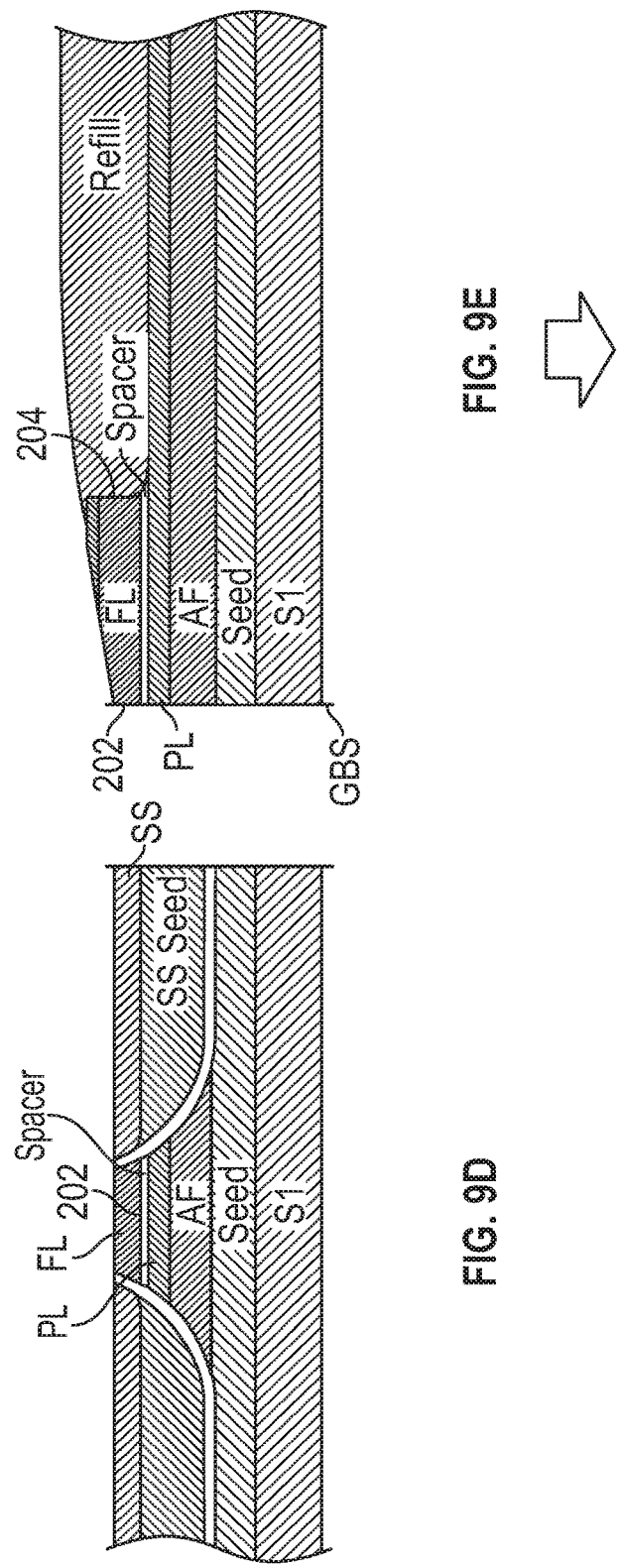

FIGS. 9A-9K are GBS and side sectional views showing the process for forming the sensor with wedge-shaped free layer. In FIGS. 9A and 9B, the seed layer and all of the layers in the sensor stack up through the capping layer have been deposited as full films on S1, after which the films have been patterned and etched to define the TW and the SH. The insulator has been deposited on the side edges of the sensor stack followed by deposition of the side shield (SS) seed and the side shields (FIG. 9A). Insulating refill material, typically alumina, has been deposited on the pinned layer (PL) at the back edge of the free layer (FL) (FIG. 9B).

In FIG. 9C the structure is etched, for example by ion beam etching, at a shallow angle, using the refill as an etch mask. The angle is selected based on the desired angle of the taper of the FL. The resulting structure is shown in the side sectional view of FIG. 9E and shows the tapered FL and removal of at least part of the capping layer. The shallow angle etching also creates a taper on the side shields, as shown by their reduced thickness at the GBS (FIG. 9D).

Figure 9I:
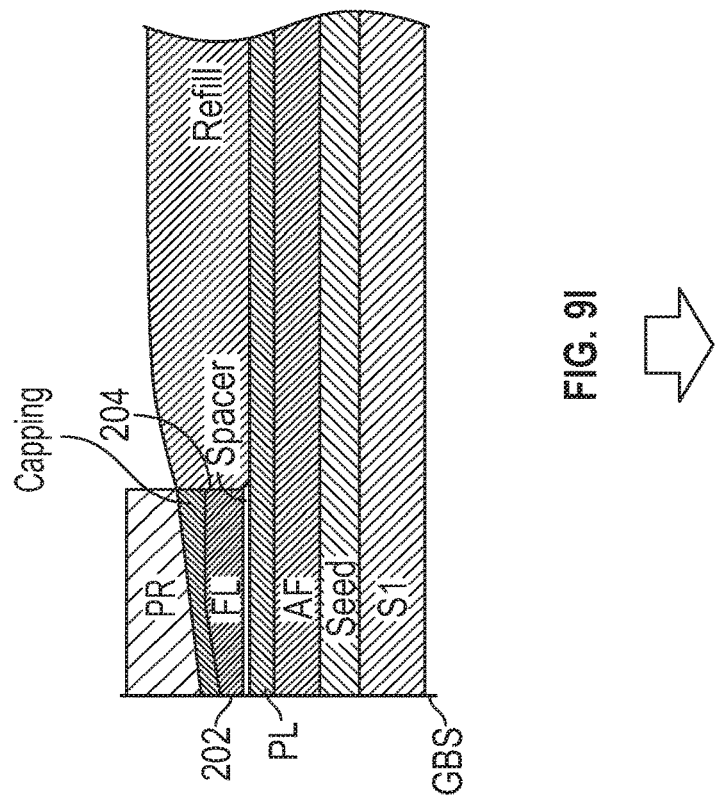
Figure 9H:
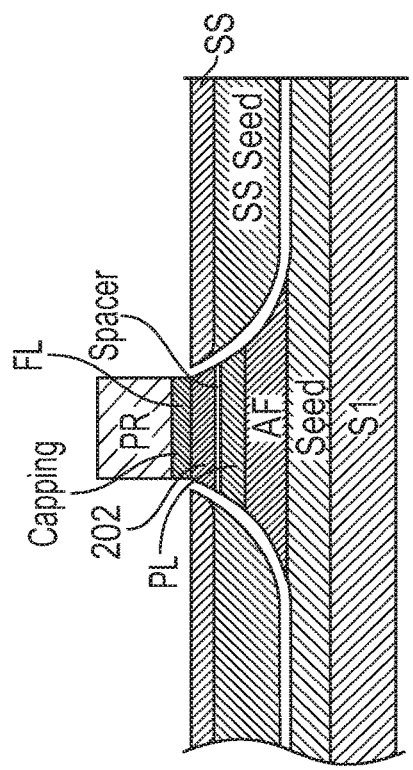

In FIGS. 9F-9G the capping layer material is deposited to the desired thickness as a full film over the entire structure. In FIGS. 9H-9I photoresist (PR) is patterned over the capping layer in the sensor region and the structure is etched to remove the capping layer material everywhere except over the FL. After removal of the PR, the material of S2 is deposited to form the completed sensor structure, as shown in FIGS. 9J-9K.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive (MR) sensor structure for detecting magnetized regions of a magnetic recording medium, the structure comprising:
   a substrate; and
   a magnetoresistive sensor on the substrate and comprising a stack of layers including a ferromagnetic free layer consisting of a single layer of ferromagnetic material or multiple layers of ferromagnetic material, the free layer having a front edge for facing the recording medium and a back edge recessed from the front edge, wherein the front edge is substantially parallel to the back edge and wherein the free layer has a thickness at the back edge greater than its thickness at the front edge.

2. The sensor structure of claim 1 wherein the thickness of the free layer back edge is at least twice the thickness of the free layer front edge.

3. The sensor structure of claim 1 wherein the structure is a current-perpendicular-to-the-plane magnetoresistive (CPP-MR) sensor structure and wherein the substrate comprises a first magnetic shield, and further comprising a second magnetic shield, wherein the stack of layers is located between said first and second magnetic shields.

4. The sensor structure of claim 3 wherein the CPP-MR sensor is a giant magnetoresistance (CPP-GMR) sensor, and wherein the stack of layers includes a ferromagnetic pinned layer and a nonmagnetic electrically conducting spacer layer between the pinned layer and the free layer.

5. The sensor structure of claim 3 wherein the CPP-MR sensor is a tunneling magnetoresistance (CPP-TMR) sensor, and wherein the stack of layers includes a ferromagnetic pinned layer and a nonmagnetic tunneling barrier layer between the pinned layer and the free layer.

6. A magnetic recording disk drive comprising:
   the MR sensor structure of claim 1; and
   a rotatable magnetic recording medium having a perpendicular magnetic recording layer with data tracks.

7. A current-perpendicular-to-the-plane magnetoresistive (CPP-MR) sensor structure for sensing magnetically recorded data from a magnetic recording medium, the structure comprising:
   a bottom shield of ferromagnetic material;
   a pinned ferromagnetic layer on the bottom shield;
   a nonmagnetic spacer layer on the pinned layer;
   a free ferromagnetic layer on the spacer layer, the free layer having a front edge for facing the recording medium, two spaced-apart side edges, and a back edge recessed a stripe height (SH) distance from the front edge,
   a top shield of ferromagnetic material on the free layer; and
   a side shield of magnetically permeable material at each of the free layer side edges, each side shield having a front edge for facing the recording medium and a back edge recessed substantially said SH distance from the side shield front edge;
   wherein the free layer and each side shield has a substantially tapered thickness from its respective back edge to its front edge.

8. The sensor structure of claim 7 wherein the CPP-MR sensor is a giant magnetoresistance (CPP-GMR) sensor, and wherein the nonmagnetic spacer layer comprises an electrically conducting layer.

9. The sensor structure of claim 7 wherein the CPP-MR sensor is a tunneling magnetoresistance (CPP-TMR) sensor, and wherein the nonmagnetic spacer layer comprises an insulating tunneling barrier layer.

10. The sensor structure of claim 7 wherein the free layer is an antiparallel-free (APF) structure comprising a first free ferromagnetic layer having a magnetization in a first direction, a second free ferromagnetic layer having a magnetization direction antiparallel to said first magnetization direction and an antiferromagnetic-coupling (AFC) layer between said first and second free ferromagnetic layers.

11. The sensor structure of claim 7 further comprising an antiparallel (AP) pinned structure, the AP-pinned structure comprising a first AP-pinned (AP1) ferromagnetic layer on the bottom shield and having an in-plane magnetization direction, a second AP-pinned (AP2) ferromagnetic layer having an in-plane magnetization direction substantially antiparallel to the magnetization direction of the AP1 layer, and an AP coupling (APC) layer between and in contact with the AP1 and AP2 layers, wherein said pinned ferromagnetic layer is said AP2 layer.

12. The sensor structure of claim 7 further comprising an antiferromagnetic layer between the bottom shield and the pinned layer and a seed layer between the antiferromagnetic layer and the bottom shield.

13. The sensor structure of claim 7 further comprising a nonmagnetic capping layer between the free layer and the top shield.

14. A magnetic recording disk drive comprising:
   the CPP-MR sensor structure of claim 7; and
   a rotatable magnetic recording medium having a perpendicular magnetic recording layer with data tracks.

15. A tunneling magnetoresistive (TMR) read head for reading magnetically recorded data from tracks on a magnetic recording disk in a disk drive, the head comprising:
   a gas-bearing slider having a gas-bearing surface (GBS) for facing the disk and a trailing surface substantially orthogonal to the GBS;
   a first shield layer on the trailing surface;
   a pinned ferromagnetic layer on the trailing surface and having an in-plane magnetization substantially orthogonal to the ABS;
   a nonmagnetic tunneling barrier layer on the pinned layer;
   a free ferromagnetic layer on the barrier layer and having an in-plane magnetization substantially parallel to the GBS in the absence of an external magnetic field and free to rotate in the presence of magnetic fields from recorded data on the disk, the free layer having a front edge substantially at the GBS, two spaced-apart side edges that define a trackwidth (TW) parallel to the GBS, and a back edge recessed a stripe height (SH) distance from the GBS, wherein the free layer back edge thickness is at least twice that of the free layer front edge thickness;
   a second shield layer on the free layer, and
   a side shield of magnetically permeable material at each of the free layer side edges, each side shield having a front edge substantially at the GBS and a back edge recessed substantially said SH distance from the side shield front edge, wherein each side shield back edge thickness is at least twice that of its front edge thickness.

16. The TMR read head of claim 15 further comprising an antiparallel (AP) pinned structure, the AP-pinned structure comprising a first AP-pinned (AP1) ferromagnetic layer on the first shield layer and having an in-plane magnetization direction, a second AP-pinned (AP2) ferromagnetic layer having an in-plane magnetization direction substantially antiparallel to the magnetization direction of the AP1 layer, and an AP coupling (APC) layer between and in contact with the AP1 and AP2 layers, wherein said pinned ferromagnetic layer is said AP2 layer.

17. The TMR read head of claim 15 further comprising an antiferromagnetic layer between the first shield layer and the pinned ferromagnetic layer and a seed layer between the antiferromagnetic layer and the first shield layer.

18. The TMR read head of claim 15 further comprising a nonmagnetic capping layer between the free layer and the second shield layer.

19. A magnetic recording disk drive comprising:
the TMR read head of claim 15; and
a rotatable magnetic recording disk having a perpendicular magnetic recording layer with data tracks.

* * * * *